Oct. 26, 1965 C. J. BROWN, JR 3,214,145
METHOD AND APPARATUS FOR MIXING GLASS BATCH MATERIALS
Filed April 5, 1962 4 Sheets-Sheet 1

INVENTOR.
Chester J. Brown, Jr.
BY
Nobbe & Swope
ATTORNEYS

Oct. 26, 1965   C. J. BROWN, JR   3,214,145
METHOD AND APPARATUS FOR MIXING GLASS BATCH MATERIALS
Filed April 5, 1962   4 Sheets-Sheet 2

INVENTOR.
Chester J. Brown, Jr.
BY
Nobbe & Swope
ATTORNEYS

Oct. 26, 1965 C. J. BROWN, JR 3,214,145
METHOD AND APPARATUS FOR MIXING GLASS BATCH MATERIALS
Filed April 5, 1962 4 Sheets-Sheet 3

INVENTOR.
Chester J. Brown, Jr.
BY
Nobbe & Swope
ATTORNEYS

Oct. 26, 1965 C. J. BROWN, JR 3,214,145
METHOD AND APPARATUS FOR MIXING GLASS BATCH MATERIALS
Filed April 5, 1962 4 Sheets-Sheet 4
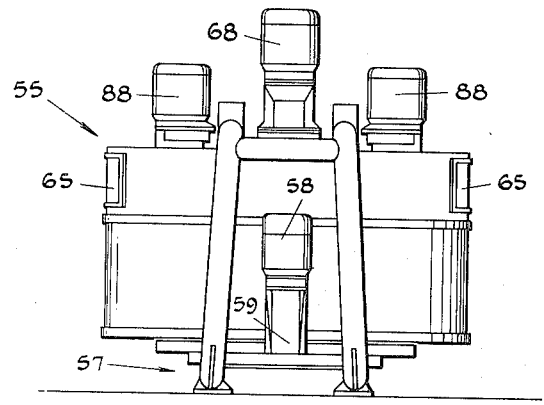
Fig. 8.
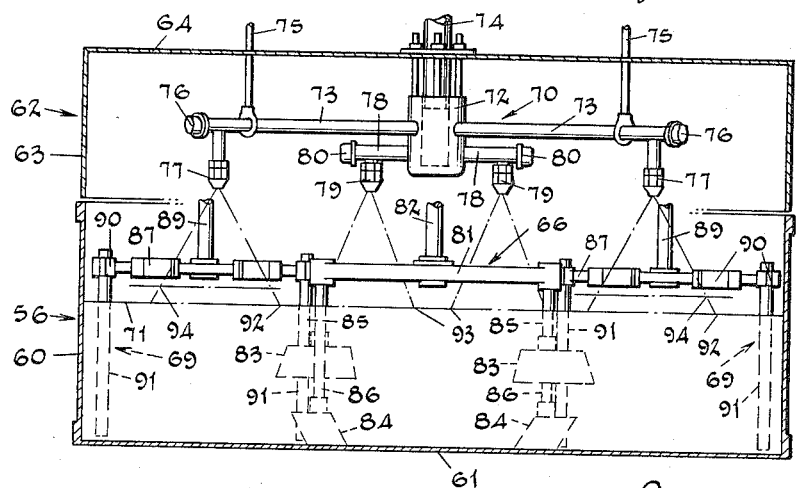
Fig. 9.
Fig. 10.
INVENTOR.
Chester J. Brown, Jr.
BY Nobbe & Swope
ATTORNEYS United States Patent Office 3,214,145
Patented Oct. 26, 1965

3,214,145
METHOD AND APPARATUS FOR MIXING
GLASS BATCH MATERIALS
Chester J. Brown, Jr., Toledo, Ohio, assignor to Libbey-Owens-Ford Glass Company, Toledo, Ohio, a corporation of Ohio
Filed Apr. 5, 1962, Ser. No. 185,266
9 Claims. (Cl. 259—15)

The present invention relates broadly to a method and apparatus for adding a liquid medium to a mass of bone dry or nearly dry batch materials. More particularly, it pertains to a method and apparatus for thoroughly intermixing measured quantities of a plurality of dry raw materials used in preparing glass batch and distributing a liquid medium uniformly therethrough to provide a homogeneous mixture.

In the continuous production of sheet or plate glass, basic raw materials such as sand, limestone and soda ash, along with lesser amounts of minor ingredients, are mixed in predetermined proportions and charged into the melting end of a tank furnace. In order to produce glass of high quality which is consistently free from defects, it has been found necessary to thoroughly mix the individual ingredients, that is, to achieve a completely homogeneous batch for charging into the furnace. Further, it is necessary that the batch be maintained in this homogeneous state and that the natural tendency of the respective components to segregate according to particle size, composition, and density be avoided during charging of the batch into the furnace, and even within the first stages of the furnace, until such time as the batch materials melt and become an integral part of the molten mass moving toward the working end of the furnace.

It has been found that the addition of a liquid medium to the dry batch materials in predetermined, accurately controlled amounts will greatly reduce, if not entirely eliminate, this segregation of the batch materials during handling and during their initial movement within the furnace. The liquid medium further tends to bind the dry constituents into a cohesive mass with specific and uniform handling characteristics, which feature is a common requirement for all continuous-blanket, glass batch charging machines. The liquid medium serves the additional purpose of reducing or preventing the phenomenon known as "dusting," wherein fine particles of batch materials are carried into the turbulent atmosphere of the melting chamber and thereafter deposited within the checkerwork of the regenerating chambers or upon the surface of the molten glass at a subsequent stage in the furnace where they cause imperfections in the finished glass.

The amount of liquid added to the batch must be accurately controlled and the liquid must be very uniformly distributed throughout the mass, with each particle being equally wetted, in order to achieve its optimum effectiveness. To accomplish this, it is necessary to have a wetting system within the batch mixer which is compatible with the type of mixing action peculiar to that class of mixers.

It is, therefore, a primary object of the present invention to provide an improved method and apparatus for admitting a liquid medium to a mass of intermixing materials in a mixer characterized by a shallow pan which is either stationary or rotating about a vertical axis and which is equipped with a plurality of mixing tools.

Another object of the present invention is to provide an improved method and apparatus for uniformly distributing a liquid medium throughout a quantity of granular materials.

Still another object of the invention is to provide an improved method and apparatus for distributing a given amount of liquid medium uniformly throughout a quantity of granular materials within the shortest possible time interval, while at the same time thoroughly intermixing the materials to achieve a homogeneous batch.

Other objects and advantages of the invention will become more apparent during the course of the following description when taken in connection with the accompanying drawings.

In the drawings wherein like numerals are employed to designate like parts throughout the same:

FIG. 8 is an end elevation of the alternate embodiment showing the location of the driving motors;

FIG. 9 is a side elevational view, partially in section, taken along line 9—9 of FIG. 7 and showing the mixing and spray apparatus of the alternate embodiment of the invention; and FIG. 10 is a plan view of the mixing pan of the alternate embodiment with the paths of travel of the batch materials being indicated by arrows.

Although the present invention will be described in detail with particular reference to its use in mixing and distributing a liquid medium through glass batch materials, it will be understood that the invention is adaptable to many other uses and is not limited to the mixing of glass batch materials.

Figure 1:
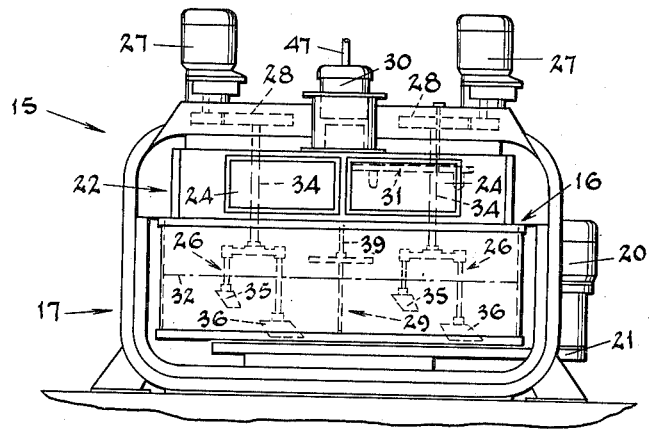
FIG. 1 is a side elevation of the apparatus of the invention with the mixing tools and spray system shown in broken lines.

Referring now to the drawings, there is shown in FIG. 1 thereof a counter-current type pan mixer 15 including a mixing pan 16 adapted to rotate about a vertical axis within a supporting framework 17. The mixing pan 16 has cylindrical walls 18 and a floor 19 and is driven by a motor 20 through a gear train 21. Mounted above the mixing pan 16 so as to close off the mixing area is a stationary dust hood 22 having sides 23 with access doors 24 therein and a ceiling 25. While in the mixing of certain materials it is possible to omit the dust hood, such a feature is highly desirable in the mixing of finely divided materials to prevent their escape during mixing prior to the addition of the liquid medium.

A pair of stars or mixing paddles, indicated generally at 26, are located within the rotating pan and each is independently driven by a motor 27 through a gear reduction unit 28 to cause mixing of the materials in a manner to be hereinafter more fully described. A rotor cage 29 driven by a motor 30 is also positioned within the rotating pan 16 and is adapted to be operated at a relatively high speed during the wet mixing phase of the mixing cycle to form an area of intense mixing and to break up the agglomerates which tend to form at this time. Positioned above the mixing paddles and rotor cage is a spray system 31 for distributing the liquid onto the surface 32 of the batch materials within the pan according to a predetermined pattern which will be hereinafter more fully described.

Figure 2:
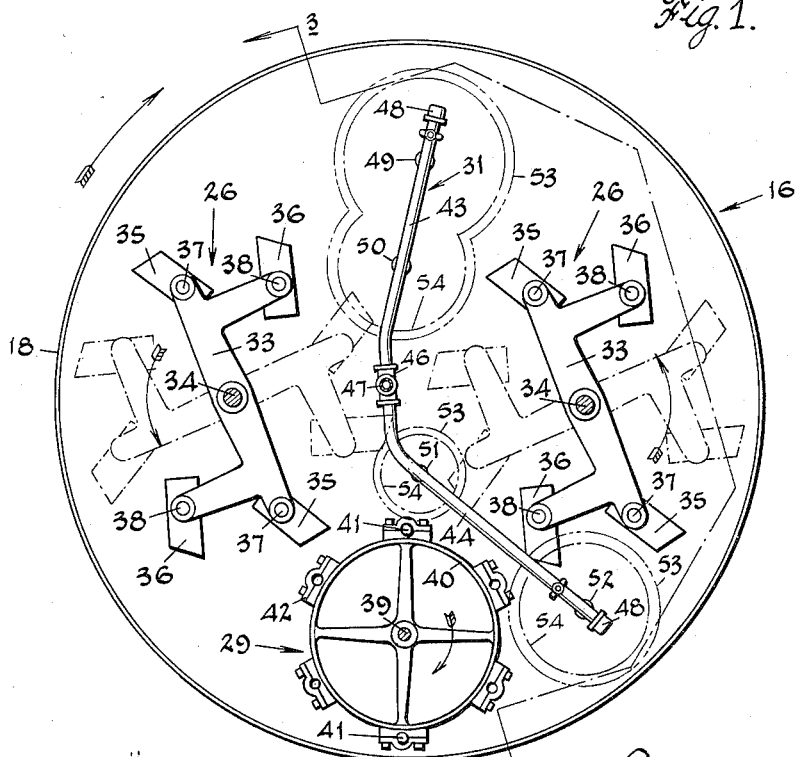
FIG. 2 is a plan view of the mixing pan of the apparatus showing the relative positions of the spray system and mixing tools.
Figure 3:
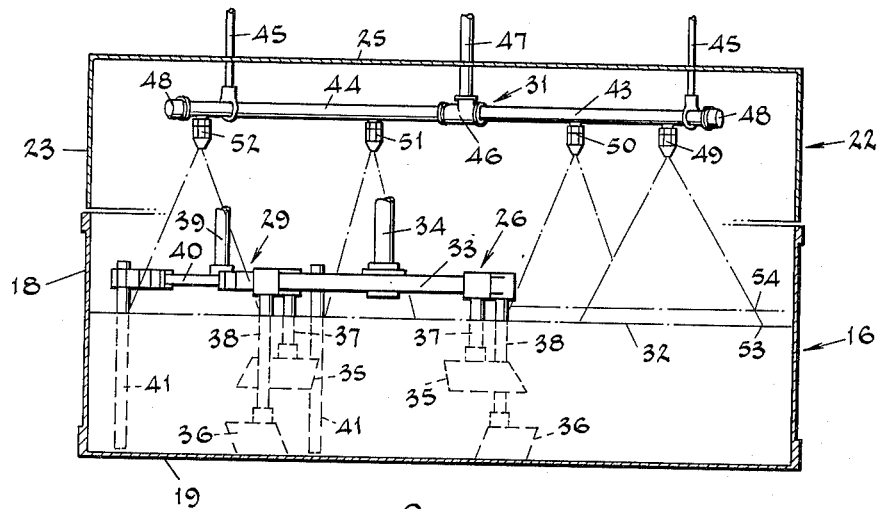
FIG. 3 is a sectional elevational view of the mixing pan taken along line 3—3 of FIG. 2, showing in broken lines the cones over which the liquid is distributed by the nozzles of the spray system.

As will best be seen in FIGS. 2 and 3, the stars or mixing paddles 26 include a mixing arm 33 mounted upon a mixing paddle drive shaft 34 which is driven through the gear reduction unit 28 by the motor 27. Pairs of upper mixing shovels 35 and lower mixing shovels 36 are carried by upper mixing shovel shafts 37 and lower mixing shovel shafts 38, respectively, affixed to the mixing arm. The mixing shovels are mounted angularly so that as the mixing arm 33 is caused to rotate on the driveshaft 34, the mixing shovels raise the batch materials ahead thereof and simultaneously displace them laterally. As will be evident in FIG. 3, the lower mixing shovels 36 operate very close to the floor 19 of the mixing pan while the upper shovels 35 operate in the area intermediate the floor of the pan and the surface 32 of the batch materials.

The rotor cage 29 includes a rotor shaft 39, driven by the motor 30, which carries at its lower end an annular rotor frame 40. The motor 30 is preferably of the variable speed type in order to impart added flexibility to the mixing system. A plurality of rotor bars 41 are fastened to the rotor frame by clamps 42 and extend downwardly approximately to the pan floor 19. The number of rotor bars carried by the rotor frame will, of course, vary depending upon such factors as the speed of the rotor, the amount of liquid medium being added, and types of material being mixed.

The arcuately shaped spray system 31 of the present invention includes liquid distributing lines 43 and 44 carried in the stationary dust hood 22 above the mixing paddles and rotor cage 29. At one of their ends, the liquid distributing lines are connected to a coupling 46 which receives liquid under pressure according to a predetermined sequence through a supply line 47 from a source (not shown). The other ends of the liquid distributing lines are closed by caps 48. Downwardly directed spray nozzles 49, 50, 51 and 52 are disposed along the underside of the liquid distributing lines and about 13 to 20 inches above the surface of the batch materials.

It has been found that the length of time required to admit and uniformly distribute the liquid throughout the batch materials can be reduced to a minimum, and hence the mixing cycle can also be reduced to a minimum, if the liquid is deposited over a large surface area in a low intensity spray while the mixer continues to operate. Thus, localized over wetting will be avoided and the liquid may be uniformly distributed with a minimum of agitation of the batch materials. It has also been found that direct wetting of the surfaces of the mixing paddles, rotor cage and mixing pan causes an objectionable layer of batch materials to build up thereon. This layer of material impedes the mixing action and may eventually break away and result in lumps in the batch.

Thus, according to the present invention, each of the spray nozzles 49 to 52 is positioned so that its spray cone avoids direct contact with the exposed portions of the rotating mixing paddles and rotor cage, as well as the wall of the mixing pan. The area over which the spray cones strike the surface of the batch material is indicated by the outer circles at 53 in FIGS. 2 and 3, while the point above the surface of the batch where the exposed portions of the rotating mixing paddles or rotor cage approach nearest to the spray cone is indicated by the inner circles at 54. The pan, mixing paddles and rotor cage rotate in the direction indicated by the arrows in FIG. 2, that is, the mixing pan and rotor cage rotate in a clockwise direction, while the mixing paddles rotate in a counterclockwise direction. In FIG. 2, the mixing paddles have also been shown in broken lines rotated approximately 90° from their solid line position to indicate their circle of movement with respect to the spray cones. It will be understood that the lower portions of the mixing paddles and rotor cage are submerged within the batch materials and therefore will not be wetted directly by the spray cones.

Figure 5:
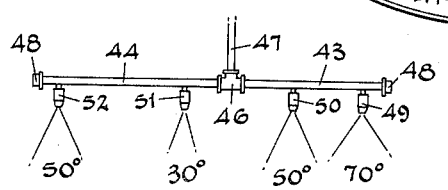
FIG. 5 is a fragmentary side elevation of the spray pattern of the invention.

For optimum dissemination, the liquid is preferably deposited on the surface of the batch materials upon a quantitative basis, that is, in the embodiment of the invention shown in FIGS. 1 through 5 the liquid is discharged from each of the nozzles 49 to 52 in proportion to the mass of the batch material passing therebeneath approximately as follows:

Nozzle 49—35% of the liquid
Nozzle 50—23% of the liquid
Nozzle 51—14% of the liquid
Nozzle 52—28% of the liquid The arrangement of spray nozzles shown in FIGS. 2, 3 and 5 is particularly well-adapted for both avoiding wetting of the mixer elements and depositing the liquid quantitatively. As shown therein, nozzle 49 emits a 70° cone, nozzles 50 and 52 emit 50° cones, and nozzle 51 emits a 30° cone.

Reviewing briefly the operation of the invention, measured quantities of the separate batch ingredients are charged into the mixer through a trapdoor located in the dust hood ceiling 25 (not shown) in a manner not constituting a part of this invention. The ingredients may either be in a dry state, or they may contain a known amount of moisture or other liquid wetting agent. During the charging of the materials into the mixer and the first phase of the mixing cycle, the pan and mixing paddles generally are in operation while the rotor cage is at rest. However, under certain conditions such as, for example, when the separate ingredients are originally high in moisture content, it may be desirable to operate the rotor cage continuously during the mixing cycle and even during charging of the batch materials into the mixer.

The predetermined quantities of batch materials are then dry-mixed for a short period of time prior to addition of the liquid. During dry-mixing, the mixing pan 16 and stars or mixing paddles 26 are rotated in opposite directions as indicated by the arrows in FIGS. 2 and 4 to thereby cause the relatively dry materials to be intermixed. After a prescribed period of dry-mixing, which may very in duration from one-half to three minutes but is preferably about two minutes, the spray system 31 and rotor cage 29 are activated while the pan and mixing paddles continue to rotate. The length of time required to add the desired amount of liquid through the spray system will depend upon several factors, among them being the volume of liquid added, its viscosity, the type of nozzle employed, and the liquid pressure at the nozzles. It is to be remembered that adding the liquid too slowly will lengthen the mixing cycle unnecessarily, while adding it at an excessive rate will cause overly wet spots in the batch and thereby impede mixing and liquid distribution.

The amount of liquid to be added to the batch may vary from zero to ten percent or more by weight of the batch materials, depending upon the moisture content of the constituents and the moisture content desired in the mixed batch. Generally, the nozzles are selected so that the desired amount of liquid will be applied during a liquid spraying phase of approximately one minute duration at a pressure of about 10 p.s.i. Upon completion of the liquid spraying phase, the spray system is preferably purged by air at 80 to 100 p.s.i. for approximately twenty seconds in order to eliminate any remaining liquid from the distributing lines and nozzles and to thereby prevent subsequent nozzle drip which might, if permitted, cause wet areas in the batch which, in turn, act as nuclei for the formation of agglomerates.

Figure 4:
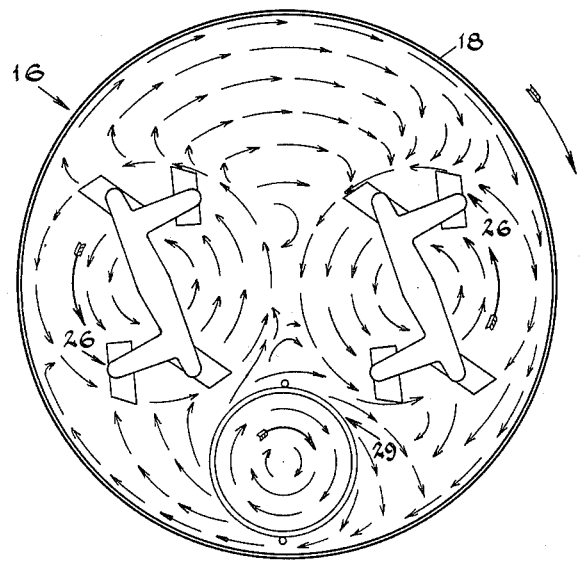
FIG. 4 is a plan view of the mixing pan showing the paths of movement of the batch materials within the pan during mixing.
Figure 6:
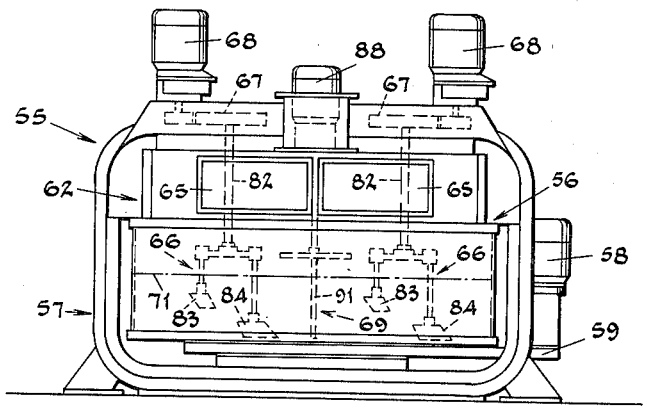
FIG. 6 is a side elevation of an alternate embodiment of the invention wherein the mixing pattern is modified by the use of an additional rotor cage.
Figure 7:
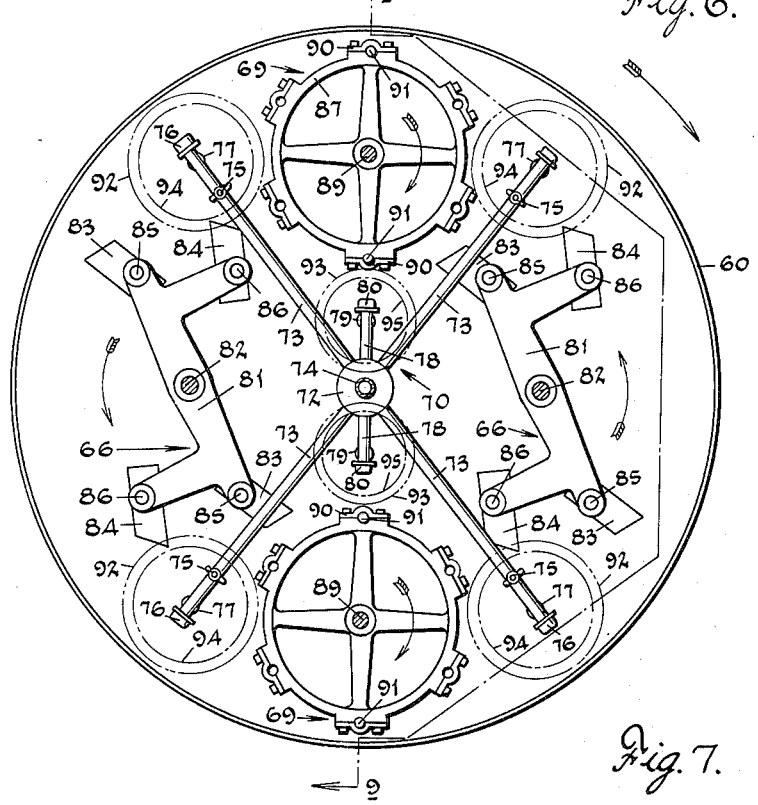
FIG. 7 is a plan view of the mixing pan of the alternate embodiment of the invention shown in FIG. 6.

Following the liquid spraying phase is a wet mixing phase during which the mixing paddles and rotating rotor cage cause the materials to move within the rotating pan 16 along the flow lines indicated in FIG. 4. The rotor cage, which is activated at the beginning of the liquid spraying phase and continues to operate for the remainder of the mixing cycle, creates an area of intense mixing and, through impact with the rotor bars, breaks up any agglomerates which tend to form in the mixing material. The intense mixing and shattering action of the rotor bars 41 is caused by the relatively high speed of the rotor cage. While the rotor cage may, in mixing certain materials, have as many as six rotor bars 41, it has been found that when a rotor cage having such a large number of rotor bars is rotated at the speed necessary to break up agglomerates in glass batch materials, the rotor bars act as a wall preventing the materials from entering the rotor cage, and its effectiveness as a mixing tool is thereby generally diminished. Optimum effectiveness in mixing conventional glass batch materials is achieved using a rotor cage employing two or three rotor bars and rotating at approximately 140 revolutions per minute.

To achieve complete homogenization of the batch and uniform distribution of the liquid therethrough, the wet mixing phase is preferably approximately two and one-half minutes in duration, resulting in a total mixing cycle of about five and one-half minutes. It has been found, however, that with the present invention, very good mixing and liquid distribution can be achieved with a total mixing cycle of only two minutes. Upon completion of the mixing cycle, the batch material is caused to be discharged to the furnace feeding system through a trap-door (not shown) in the pan floor 19 by the continued rotation of the mixing paddles 26 and the pan 16. The mixer is then in readiness to receive additional batch materials and repeat the mixing cycle.

There is shown in FIGS. 6 through 10 an additional embodiment of the invention wherein the mixing pattern within the pan has been modified in order to greatly increase the capacity of the mixing system. There is a tendency at the present time toward increasing the amount of moisture in the batch materials added to the glass melting tank. While either embodiment of the present invention will distribute this increased amount of moisture uniformly through the batch, the embodiment shown in FIGS. 6 through 10 permits the liquid to be added at a much faster rate without causing localized over wetting in the batch.

This increased rate of adding liquid is made possible by a second rotor cage positioned in a previously dormant zone of the mixer so that mixing takes place in all quadrants of the rotating pan. Using a spray system to be hereinafter described, it is possible to add liquid at a rate over three times as great with the dual rotor cage arrangement as with the previously described embodiment. Thus, the dual rotor cage arrangement makes possible the addition to, and distribution through, the batch of a greatly increased amount of liquid without lengthening the mixing cycle.

The alternate embodiment of the invention as shown in FIGS. 6 through 10 has, in addition to the stars or mixing paddles and rotor cage of the embodiment of FIGS. 1 through 5, a second rotor cage positioned so as to divide the mixing pan into quadrants, each quadrant having a mixing paddle or a rotor cage. Thus, the alternate embodiment comprises a counter-current type mixer 55 having a mixing pan 56 mounted within a framework 57 for rotation about a vertical axis by a driving motor 58 and gear train 59. The pan includes cylindrical side walls 60 and a floor 61. A stationary dust hood 62, having sides 63 and a roof 64, fits over the rotating mixing drum 56 to form a closed mixing area. Access doors 65 are located in the sides of the dust hood.

Mixing stars or paddles 66 are individually driven through gear reduction units 67 by motors 68 located atop the mixer. Rotor cages 69 are positioned in the quadrants of the mixing pan 90° removed from the mixing paddles 66 so that when both the mixing paddles and rotor cages are in operation, there exists no large inert area in the mixer as will be evident from the flow paths of the material in FIG. 10.

A spray system indicated generally at 70 is mounted in the dust hood above the mixing paddles and rotor cages for depositing the liquid medium upon the surface 71 of the material within the pan 56. The spray system includes a manifold 72 from which elongated distributing lines 73 radiate outwardly above the spaces between adjacent mixing paddles and rotor cages. A conduit 74 connects the manifold 72 to mechanism (not shown) for supplying liquid or air under pressure thereto according to a predetermined sequence. The elongated distributing lines 73 are supported near their outer extremities by hangers 75 and their ends are closed by caps 76. Spray nozzles 77 depend from the underside of the elongated distributing lines and are positioned so as to avoid direct wetting of exposed portions of the rotating mixing paddles, rotor cages and pan wall to thereby prevent the buildup of batch materials thereon. Stub distributing lines 78 are cantilevered from the manifold 72 to supply additional nozzles 79 with liquid to be distributed over the surface 71 of the batch materials in the central area of the pan. Caps 80 close the outer ends of the stub distributing lines.

The mixing paddles 66 and rotor cages 69 are similar in construction to those described in connection with the earlier discussed embodiment of the invention. Thus, the mixing paddles include a mixing arm 81 carried by a mixing paddle driveshaft 82 which is driven by the motor 68 through gear reduction units 67. Upper mixing shovels 83 and lower mixing shovels 84 are carried on upper and lower mixing shovel shafts 85 and 86, respectively, attached to the mixing arms 81.

The rotor cages 69 comprise an annular frame 87 driven by an independent rotor motor 88 through a rotor shaft 89, and include clamps 90 located on the outer periphery of the annular frame from which are suspended rotor bars 91. As in the earlier described embodiment, the annular frame may carry from two to six rotor bars depending upon the particular mixing requirements, and the clamps 90 are therefore made so that the rotor bars can be easily and quickly added or removed to meet changing conditions. It is also desirable that the motors 88 which drive the rotor cages have variable speed controls to provide complete flexibility of operation.

The preferred operating procedure for the modified embodiment is essentially the same as for the earlier described embodiment. Thus, measured amounts of the individual ingredients are deposited in the mixer and the ingredients are then mixed in the dry state for a period of approximately two minutes with the pan 56 rotating clockwise and the mixing paddles 66 rotating in a counter-clockwise direction as indicated by the arrows in FIG. 7.

Thereafter, the spray system 70 and rotor cages 69 are simultaneously activated to begin the distribution of the liquid medium throughout the batch materials. The spray nozzles 77 preferably emit a 70° cone to deposit liquid on the circular area 92 of the batch material surface 71 as will be seen in FIG. 7, while the nozzles 79 emit a 50° spray cone in depositing liquid on the circular area 93. Thus, each of the nozzles 77 should preferably discharge about 20 or 21 percent of the total amount of liquid added and each of the nozzles 79 should discharge about 9 or 10 percent thereof to achieve quantitative distribution on the surface of the batch materials. Inner circles 94 and 95 represent the points above the surface of the batch materials where the rotating mixing elements approach nearest to the spray cones emitted by nozzles 77 and 79, respectively, without entering the spray.

The spraying phase, again preferably approximately one minute in duration, is followed by an 80 to 100 p.s.i. air purge of approximately twenty seconds duration through the spray system to eliminate liquid therefrom and to thereby prevent subsequent nozzle drip. Following deactivation of the spray system, wet mixing continues with both the mixing paddles 66 and the rotor cages 69 operating to create the intense mixing pattern having the lines of flow indicated in FIG. 10. To achieve complete homogeneity, the wet mixing phase of the mixing cycle again preferably extends for a period of approximately two and one-half minutes, resulting in a total mixing cycle of five and one-half minutes. Upon completion of the mixing cycle, the mixed batch is discharged through the bottom of the mixer as in the earlier described embodiment, and the equipment is ready to repeat the cycle.

The dual rotor cage embodiment of the invention, due to its ability to rapidly disperse liquid medium, is particularly well adapted for mixing glass batch materials wherein one or more of the constituents thereof has a high moisture content. In mixing such materials, the dust problem is not critical and it may therefore be desirable to operate the rotor cages during the entire mixing cycle to disintegrate lumps in the material and to more rapidly intermix the wet and dry ingredients.

From the foregoing, it is believed apparent that the present invention contemplates an improved method and apparatus for intermixing separate glass batch ingredients and for distributing a liquid medium therethrough so as to prevent subsequent segregation. As a result of the improved batch mixing achieved by the present invention, it has been found possible to increase the production of existing glass furnaces, while at the same time improving the quality of the finished product.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

I claim:

1. In a method of preparing glass batch materials wherein separate batch ingredients are charged into a mixing pan and intermixed by mixing paddles and a rotor cage within said pan, the steps of rotating said mixing pan in a substantially horizontal plane about its longitudinal axis, rotating the mixing paddles at a relatively slow speed in the direction opposite to said mixing pan, depositing a predetermined amount of a liquid medium onto the surface of the mixing batch materials after said materials have been partially intermixed and simultaneously rotating said rotor cage at a relatively high speed to intensely intermix said batch materials and break up the agglomerate therein, and continuing to rotate the mixing pan, mixing paddles and rotor cage after said liquid medium has been deposited until the glass batch materials become a substantially homogeneous mixture having the liquid medium uniformly distributed therethrough.

2. In a method of preparing glass batch materials as claimed in claim 1, wherein said liquid medium is sprayed from a plurality of nozzles onto the surface of the intermixing batch materials in the spaces between the mixing paddles and rotor cage in proportion to the mass of batch materials passing beneath each said nozzle, and a blast of air follows the spraying of the liquid medium to purge said liquid medium from said spray system.

3. In a method of preparing glass batch materials wherein separate batch ingredients are charged into a mixing pan and intermixed by a pair of mixing paddles and a pair of rotor cages within said pan, the steps of rotating said mixing pan in a substantially horizontal plane about its longitudinal axis, rotating said mixing paddles in opposed quadrants of the mixing pan at a relatively slow speed in the direction opposite to said mixing pan, rotating said rotor cages in the other quadrants of the mixing pan at a relatively high speed to create areas of intense mixing in said batch materials and to break up agglomerates therein, said mixing paddles being rotated for an initial period while said rotor cages are inactive to partially intermix the batch materials, depositing a predetermined amount of liquid medium onto the surface of the intermixing batch materials, said depositing of the liquid medium being initiated simultaneously with the rotation of said rotor cages, and continuing to rotate the mixing pan, mixing paddles and rotor cages after depositing of the liquid medium has been completed to thoroughly intermix the batch materials and uniformly distribute the liquid medium therethrough.

4. In a method of preparing glass batch materials as claimed in claim 3, wherein said liquid medium is sprayed from a plurality of nozzles onto the surface of the intermixing batch materials in the spaces between the mixing paddles and rotor cages in proportion to the mass of batch materials passing beneath each said nozzle, and an air blast follows the spraying of said liquid medium to purge the liquid medium from said spray system.

5. Apparatus for mixing glass batch materials comprising, in combination, a mixing pan for receiving predetermined quantities of glass batch constituents, said mixing pan being adapted to rotate in a substantially horizontal plane about its longitudinal axis, means disposed within said pan for intermixing said batch constituents in response to rotation of said pan, said means for intermixing the batch constituents comprising mixing paddles in opposed quadrants of the mixing pan adapted to rotate at a relatively slow speed in the direction opposite to said mixing pan and a rotor cage in another quadrant of said mixing pan adapted to be driven at a relatively high speed for intensely mixing said batch constituents and for breaking up agglomerate therein, and a spray system mounted above said mixing paddles and rotor cage for depositing a liquid medium on the surface of the intermixing batch constituents, said spray system including distributing lines carrying a plurality of spray nozzles along their underside, said spray nozzles being positioned so as to avoid spraying of the liquid medium onto exposed portions of the rotating mixing paddles, rotor cage and mixing pan.

6. Apparatus for mixing glass batch materials comprising, in combination, a mixing pan for receiving predetermined quantities of glass batch constituents, said mixing pan being adapted to rotate in a substantially horizontal plane about its longitudinal axis, means disposed within said pan for intermixing said batch constituents in response to rotation of said pan, said means for intermixing the batch constituents comprising mixing paddles in opposed quadrants of the mixing pan adapted to rotate at a relatively slow speed in the direction opposite said mixing pan and a rotor cage in another quadrant of said mixing pan adapted to be driven at a relatively high speed for intensely mixing said batch constituents and for breaking up agglomerates therein, and a spray system mounted above said mixing paddles and rotor cage for depositing a liquid medium on the surface of the intermixing batch constituents, said spray system being arcuate in shape and including a coupling for receiving the liquid medium under pressure, a first distributing line extending outwardly from said coupling toward the wall of said mixing pan above the space between said rotor cage and one of said mixing paddles, a downwardly directed 50° full cone spray nozzle near the outer end of said first distributing line and a downwardly directed 30° full cone spray nozzle near the inner end thereof, and a second distributing line extending outwardly from said coupling toward the wall of said mixing drum above the space between said mixing paddles, said second distributing line having a downwardly directed 70° full cone spray nozzle near the outer end thereof and a downwardly directed 50° full cone spray nozzle between said 70° spray nozzle and the inner end thereof.

7. Apparatus for mixing glass batch materials comprising, in combination, a mixing pan for receiving predetermined quantities of glass batch constituents, said mixing pan being adapted to rotate in a substantially horizontal plane about its longitudinal axis, a pair of mixing paddles disposed in opposite quadrants of said mixing pan and adapted to rotate about axes substantially parallel to the longitudinal axis of the mixing pan in the direction opposite to said mixing pan, a pair of rotor cages disposed in the other opposite quadrants of said mixing pan, said rotor cages being adapted to rotate at a relatively high speed to thereby intensely intermix the batch constituents and break up agglomerates therein, and a spray system mounted above said mixing paddles and rotor cages for depositing a liquid medium upon the surface of the intermixing batch constituents, said spray system including a plurality of distributing lines positioned above said mixing paddles and rotor cages, said distributing lines carrying downwardly directed spray nozzles positioned so as to avoid spraying of the liquid medium onto exposed portions of the rotating mixing paddles, rotor cages and mixing pan.

8. Apparatus for mixing glass batch materials comprising, in combination, a mixing pan for receiving predetermined quantities of glass batch constituents, said mixing pan being adapted to rotate in a substantially horizontal plane about its longitudinal axis, a pair of mixing paddles disposed in opposite quadrants of said mixing pan and adapted to rotate about axes substantially parallel to the longitudinal axis of the mixing pan in the direction opposite to said mixing pan, a pair of rotor cages disposed in the other opposite quadrants of said mixing pan, said rotor cages being adapted to rotate at a relatively high speed to thereby intensely intermix the batch constituents and break up agglomerates therein, and a spray system mounted above said mixing paddles and rotor cages for depositing a liquid medium upon the surface of the intermixing batch constituents, said spray system including a central manifold for receiving the liquid medium under pressure, elongated distributing lines radiating outwardly from said central manifold toward the wall of said mixing pan above the spaces between adjacent mixing paddles and rotor cages, a downwardly directed spray nozzle near the outer end of each said elongated distributing line, and a pair of stub distributing lines radiating outwardly from said manifold toward said rotor cages, each said stub distributing line carrying a downwardly directed spray nozzle near its outer end.

9. Apparatus for mixing glass batch materials as claimed in claim 8, wherein the spray nozzle carried by each said elongated distributing line emits approximately a 70° full cone spray and the spray nozzle carried by each said stub distributing line emits approximately a 50° full cone spray, each of said spray nozzles being positioned so as to avoid spraying of the liquid medium onto exposed portions of the rotating mixing pan, mixing paddles and rotor cages.

References Cited by the Examiner
UNITED STATES PATENTS

| | | | |
|---|---|---|---|
| 1,587,529 | 6/26 | Hoyt | 239—112 |
| 2,309,036 | 1/43 | Beardsley | 259—99 |
| 2,594,975 | 4/52 | Mytling | 259—16 X |
| 2,813,036 | 11/57 | Poole | 106—52 |
| 3,065,090 | 11/62 | Hopkins | 106—52 |
| 3,081,180 | 3/63 | Krinov | 106—52 |
| 3,081,983 | 3/63 | Thibodeaux | 259—178 |
| 3,109,632 | 11/63 | Wiegel | 259—84 |

FOREIGN PATENTS

| | | |
|---|---|---|
| 233,783 | 4/11 | Germany. |
| 18,916 | 11/89 | Great Britain. |
| 888,639 | 1/62 | Great Britain. |

OTHER REFERENCES

Tooley, Fay V.: Handbook of Glass Manufacture, New York, Ogden Publishing Company, 1953 (pages 93 and 96), T.P. 857 T 6 C.3.

CHARLES A. WILLMUTH, *Primary Examiner.*